Figure 1:
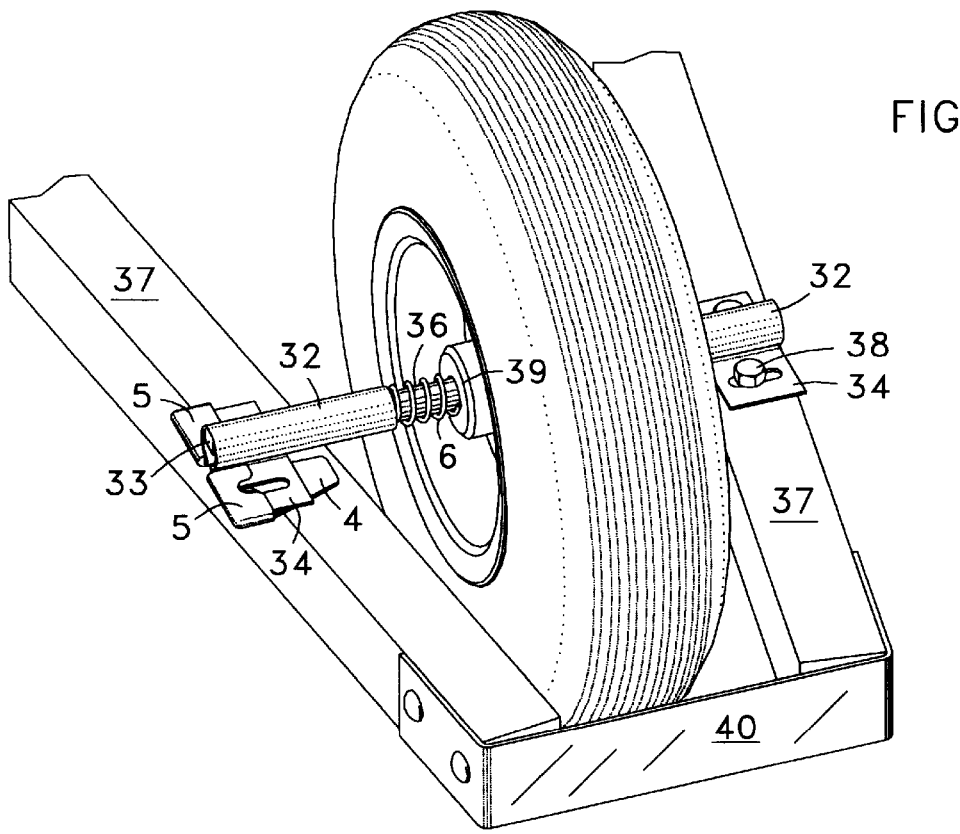

United States Patent [19]
Steinat et al.

[11] Patent Number: 6,095,535
[45] Date of Patent: Aug. 1, 2000

[54] TOOL-LESS RELEASABLE AXLE MOUNT FOR WHEEL BARROWS

[76] Inventors: Gus Steinat, 302 Mohawk Trail; Franklin Steinat, Jr., 602 Casa Park Cir., Ct. L, both of Winter Springs, Fla. 32708

[21] Appl. No.: 08/843,513

[22] Filed: Apr. 16, 1997

[51] Int. Cl.⁷ .............................. B62B 1/20; B60B 29/00
[52] U.S. Cl. ................................. 280/47.31; 280/47.32; 301/111; 301/125
[58] Field of Search .................. 280/47.31, 47.32, 280/47.3; 298/3; 301/111, 125, 7, 119, 132, 120, 122

[56] References Cited

U.S. PATENT DOCUMENTS

| | | | |
|---|---|---|---|
| 412,453 | 10/1889 | Blais | 301/122 |
| 1,192,688 | 7/1916 | Sargent | 301/120 |
| 1,370,611 | 3/1921 | Shuffleton | 280/80.1 |
| 1,457,972 | 6/1923 | Gilbert | 280/47.31 |
| 1,951,477 | 3/1934 | Gaunett | 267/41 |
| 2,176,780 | 10/1939 | Wood | 280/47.31 |
| 2,242,068 | 5/1941 | Harris | 280/47.31 |
| 2,422,331 | 6/1947 | Bates | 280/42 |
| 2,588,503 | 3/1952 | Dwyer | 280/52 |
| 3,565,453 | 2/1971 | Del Raso | 280/47.31 |
| 3,827,369 | 8/1974 | Mueller | 104/118 |
| 4,400,038 | 8/1983 | Hosokawa | 301/111 |
| 4,401,313 | 8/1983 | Filas | 280/47.31 |
| 5,033,760 | 7/1991 | Evans | 280/47.26 |
| 5,149,116 | 9/1992 | Donze et al. | 280/47.26 |
| 5,358,314 | 10/1994 | Spadotto | 301/111 |
| 5,408,854 | 4/1995 | Chiu | 70/225 |
| 5,806,878 | 9/1998 | Mroczka et al. | |

FOREIGN PATENT DOCUMENTS

| | | |
|---|---|---|
| 1398149 | 6/1975 | United Kingdom . |
| 2213781 | 8/1998 | United Kingdom . |

*Primary Examiner*—Brian L. Johnson
*Assistant Examiner*—Bridget Avery
*Attorney, Agent, or Firm*—John V. Stewart

[57] ABSTRACT

A mounting device that quickly releases one end of a wheel barrow axle for wheel removal. In a first embodiment, the existing axle end cups (32) are reused. This embodiment comprises a sheath (5) bolted to the barrow frame rail (37) in place of an axle end cup. The fastening plate (34) of the original cup is held in the sheath by a compression spring (6) around the axle between the cup and wheel hub (39). To release the cup from the sheath, the cup is manually pushed toward the wheel against the spring force. A second embodiment replaces an axle end cup with two plates (11, 12) that are hinged together, defining a cup between them, and which pivot apart upon removal of a spring clip (21) to release the axle.

5 Claims, 6 Drawing Sheets

TOOL-LESS RELEASABLE AXLE MOUNT FOR WHEEL BARROWS

BACKGROUND

1. Field

This invention relates to axle mounting devices for wheel barrows.

2. Prior Art

Conventional wheel barrows have wheels that are not easily removable for maintenance. Each end of the axle is attached to a rail of the barrow frame via a cup with fastening plates. For wheel removal, one of these cups must be detached with a wrench, by removing two bolts. The axle can then slip out of the other cup. When a flat tire occurs on construction sites, this time-consuming procedure, including retrieving and returning a wrench, is costly in terms of productivity.

Tool-less releasable axle mounts are used on bicycles, but such mechanisms are not adaptable to wheel barrows. Bicycle axles are mounted between two mounting plates which are attached to the ends of the front fork and the ends of the two rear seat stays. Both of these mounting sites are flexible. For stability, the plates are clamped against the bearing cones on the axle by means such as a lever-operated cam. U.S. Pat. No. 4,400,038 (Hosokawa) shows an example of quick-release type hubs for bicycles. Wheel barrows used in the construction industry have the stable frame type shown herein, in which a bicycle type quick-release for the axle is unnecessary. The axle mounting site is rigid, due to a rail stabilizing strap (40). A wheel barrow axle is a simple cylin-drical rod with no bearing cone, so a bicycle-type cam fastener U.S. Pat. No. 4,401,313 (Filas) shows a collapsible wheel barrow, including a wheel axle retained by pins. The wheel is mounted in a fork as on a bicycle, but without a clamping fastener. Thus, this barrow is not stable enough for construction use, in which heavy loads and rough terrain are normal. U.S. Pat. No. 1,457,972 (Gilbert) shows a toy wheel barrow with an axle retained by cotter pins in a fork.

SUMMARY

The objective of the present invention is a wheel barrow axle mount that is stable, but quickly releasable without tools. Another objective is low cost, and a third objective is retrofit capability for conventional wheel barrows via a kit.

These objectives are met by a mounting device that quickly releases one end of the axle. In a first embodiment, the existing axle end cups (32) are re-used. This embodiment comprises a sheath (5) bolted to the barrow frame rail (37) in place of an axle end cup. The fastening plate (34) of the original cup is held in the sheath by a compression spring (6) around the axle between the cup and wheel hub (39). To release the cup from the sheath, the cup is manually pushed toward the wheel against the spring force. A second embodiment replaces an axle end cup with two plates (11, 12) that are hinged together, defining a cup between them, and which pivot apart upon removal of a spring clip (21) to release the axle.

DRAWINGS

All drawings show the wheel barrow inverted for wheel maintenance.

FIG. 1 Bottom frontal perspective view of barrow wheel with releasable mount

Figure 2:
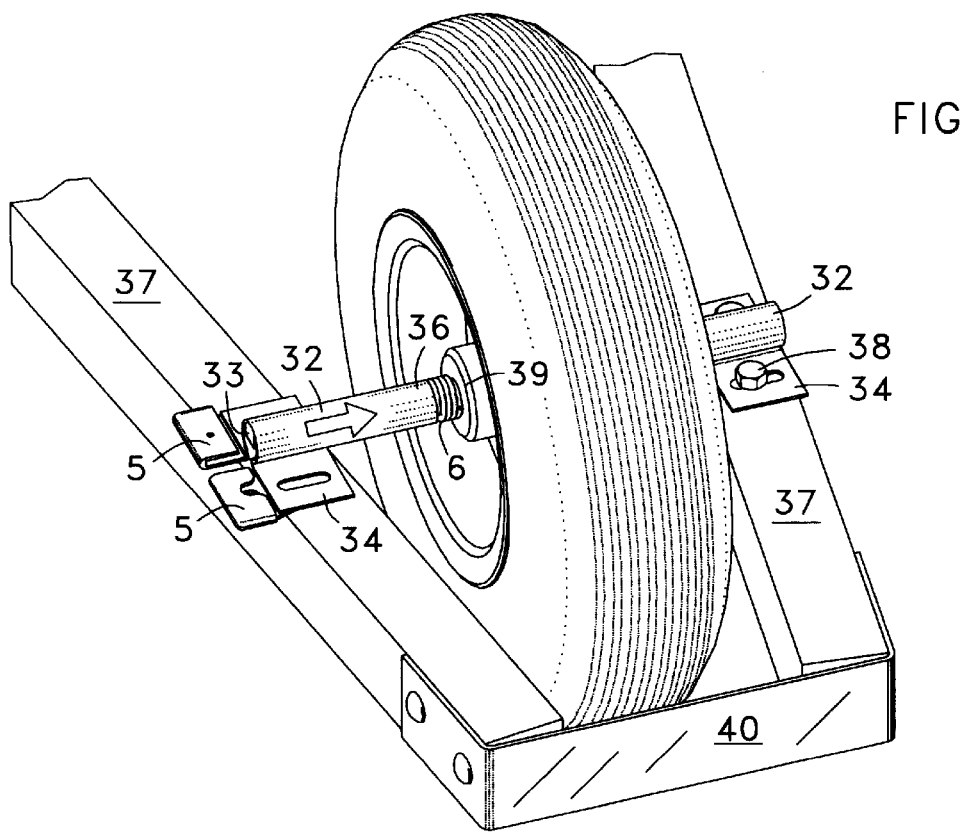
Figure 3:
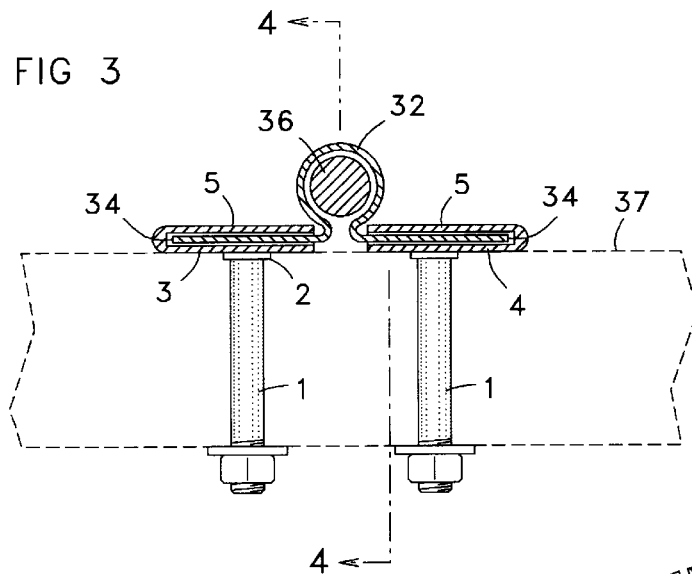
Figure 4:
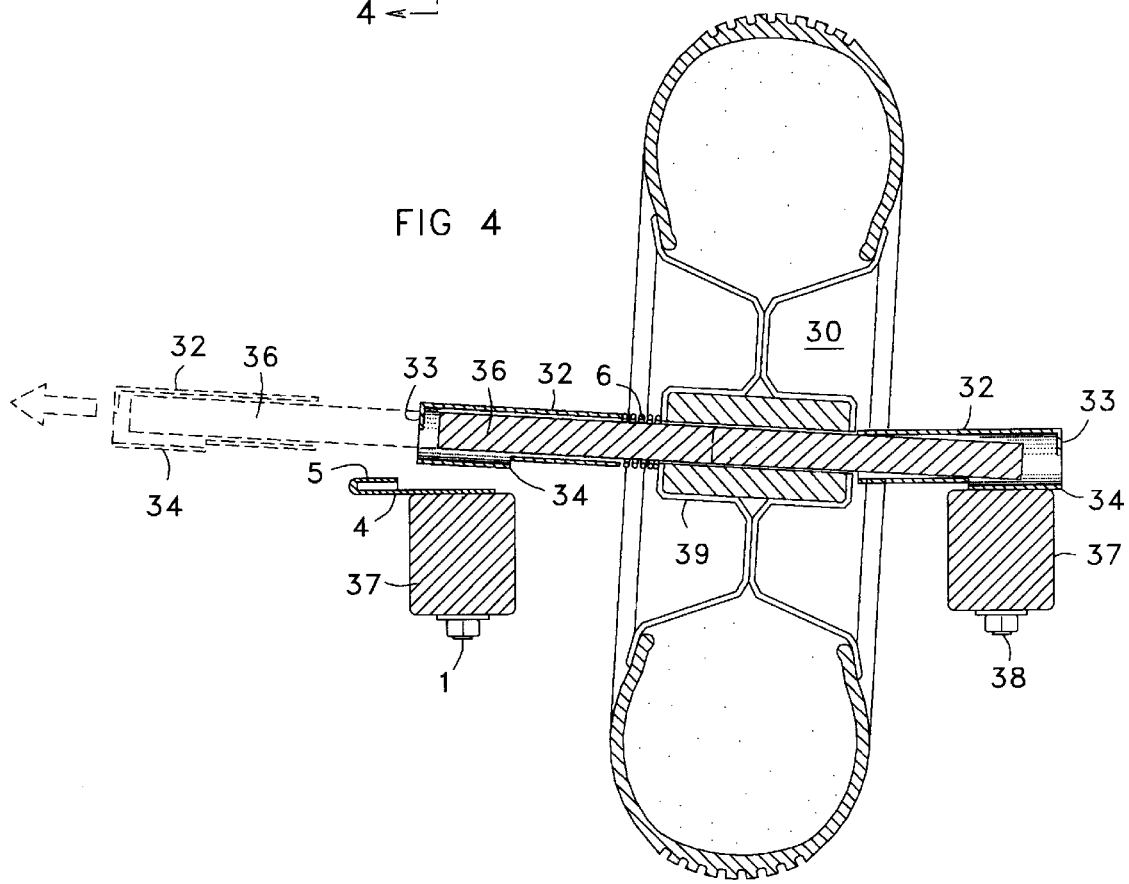

FIG. 2 View as in FIG. 1, with axle end cup (32) pushed inward for release from mount FIG. 3 Sectional end view of axle (36) in cup (32) with fastening plates (34) retained in sheath (5) of releasable axle mount FIG. 4 Front sectional view of wheel on inverted barrow with axle rotated for release. Taken along line 4—4 of FIG. 3.

Figure 5:
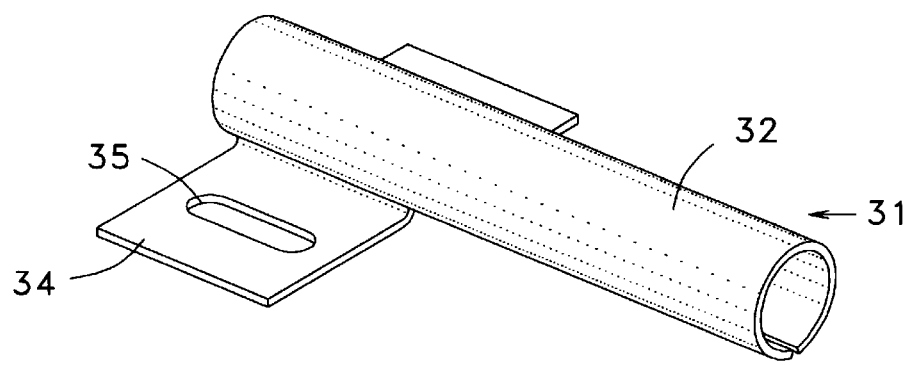
Figure 6:
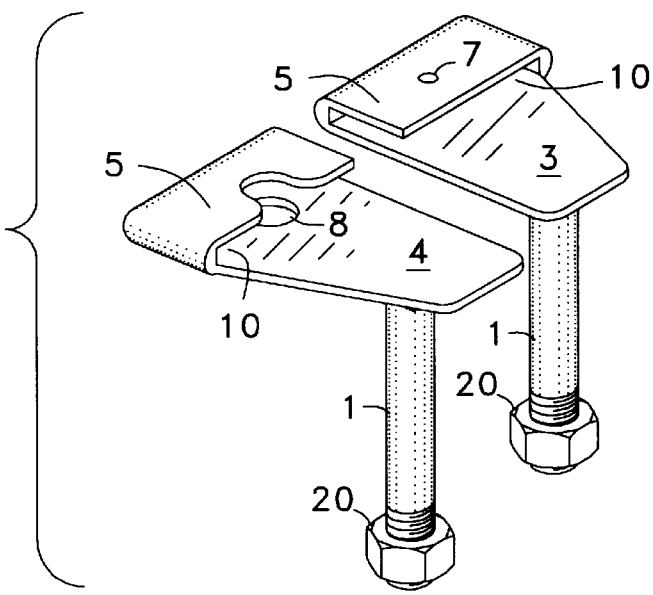
Figure 7:
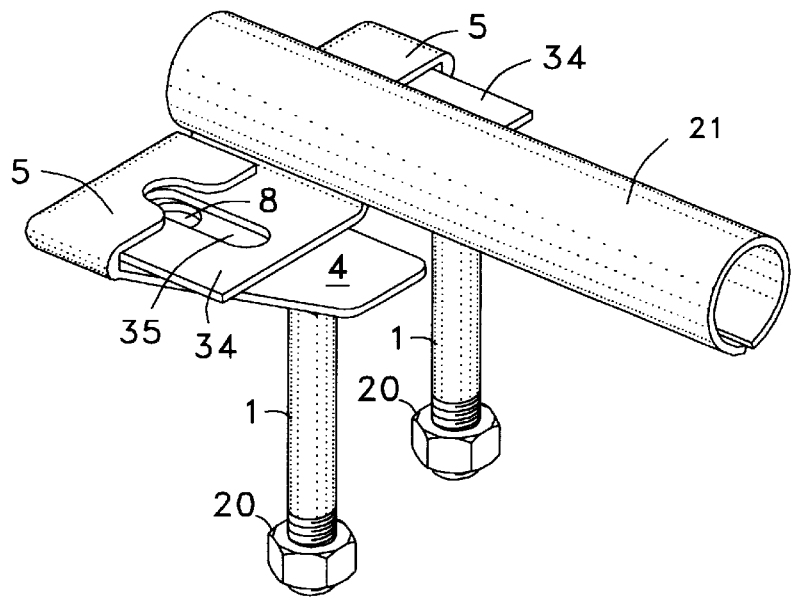
Figure 8:
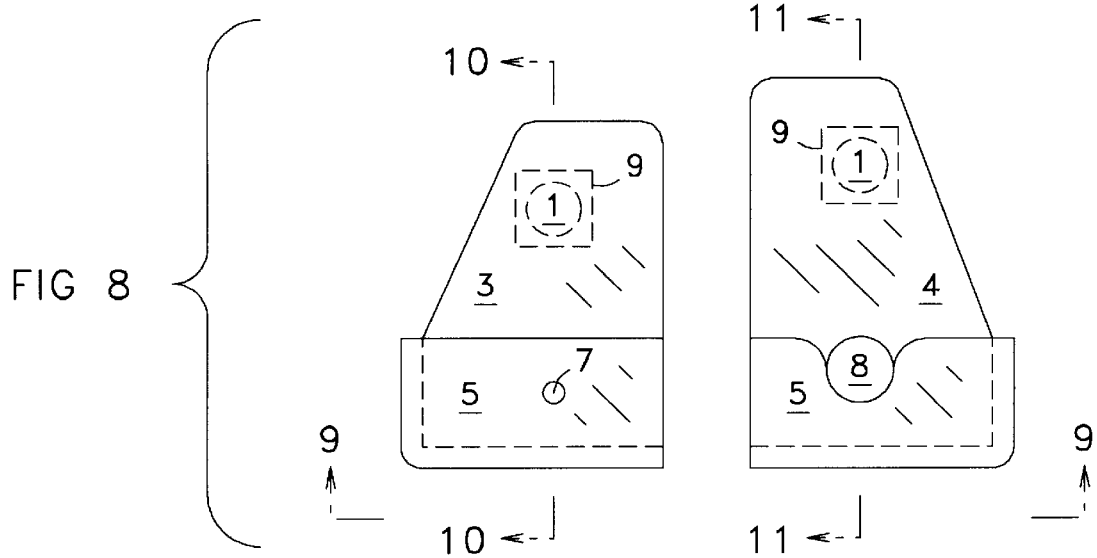
Figure 9:
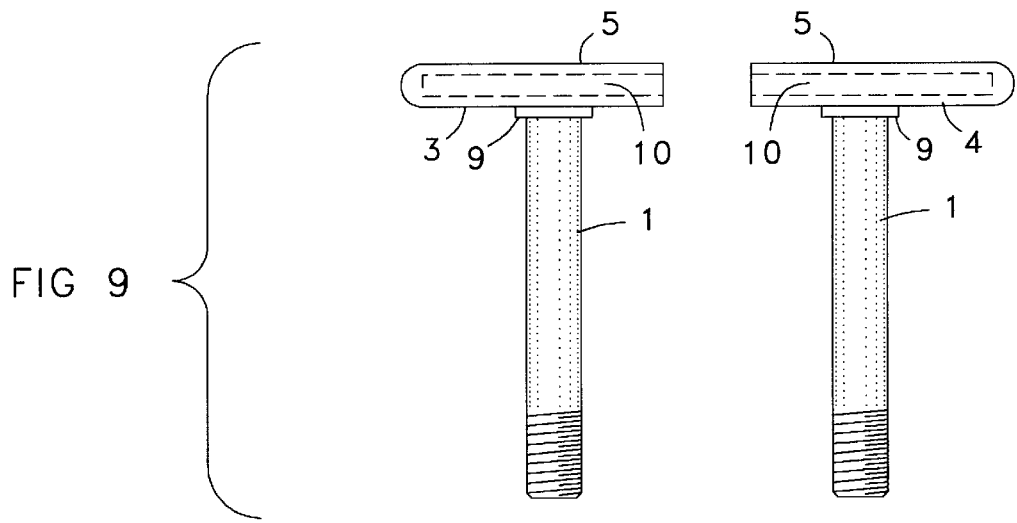

FIG. 5 Conventional axle end cup (32) with fastening plates (34) FIG. 6 Perspective view of releasable axle mount sheath of the present invention FIG. 7 Perspective view of conventional axle end cup fastening plates (34) inserted in sheath (5) of releasable axle mount FIG. 8 Top view of releasable axle mount of the present invention FIG. 9 Side view of releasable axle mount from line 9—9 of FIG. 8

Figure 10:
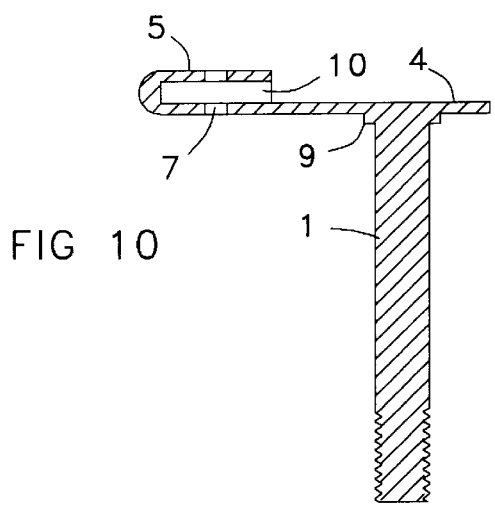

FIG. 10 Front sectional view of first axle mount bolt taken along line 10—10 of FIG. 8

Figure 11:
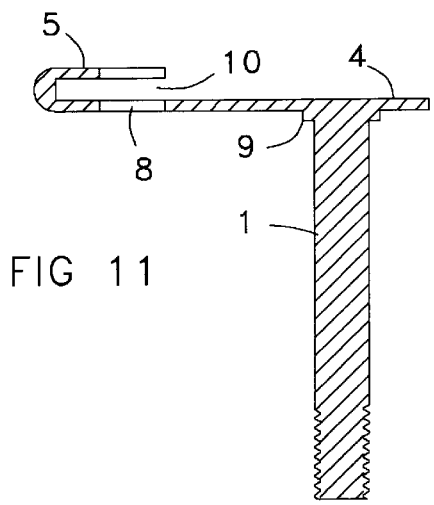

FIG. 11 Front sectional view of second axle mount bolt taken along line 11—11 of FIG. 8

Figure 12:
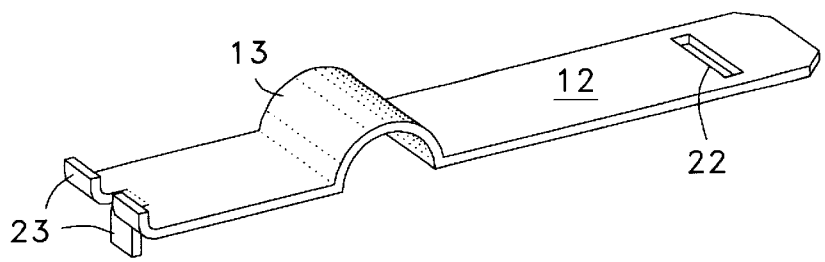

FIG. 12 Perspective view of pivoting plate of second embodiment

Figure 13:
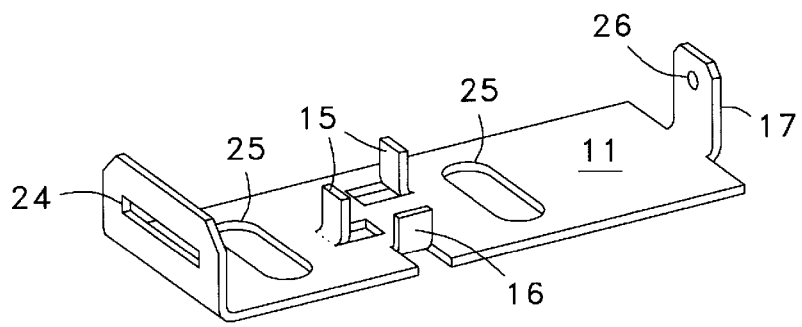

FIG. 13 Perspective view of fixed plate of second embodiment

Figure 14:
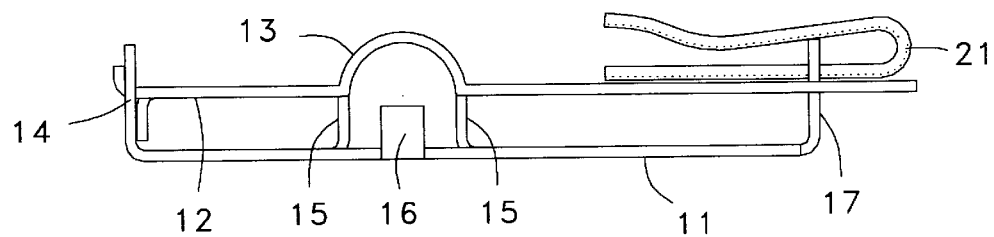

FIG. 14 Side view of assembled plates of second embodiment

Figure 15:
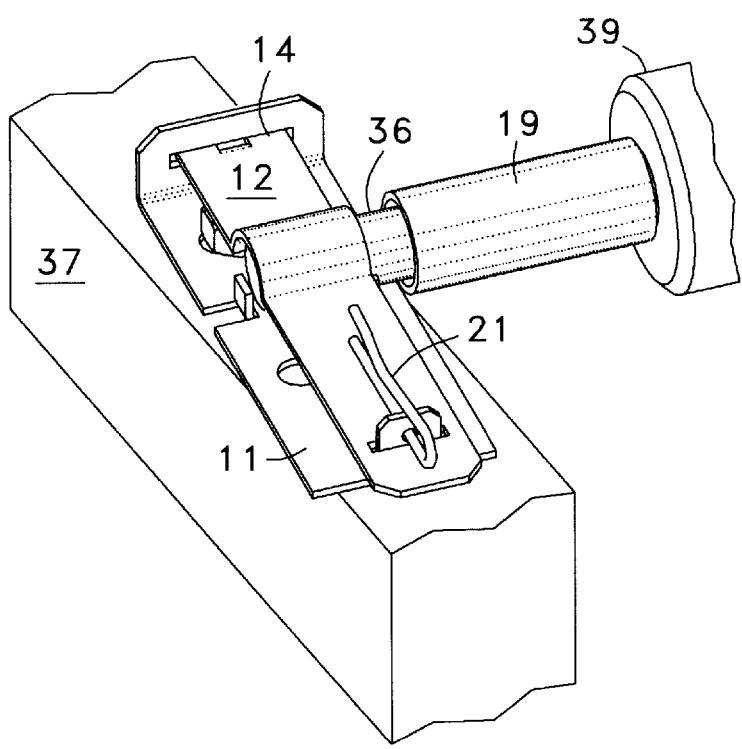
Figure 16:
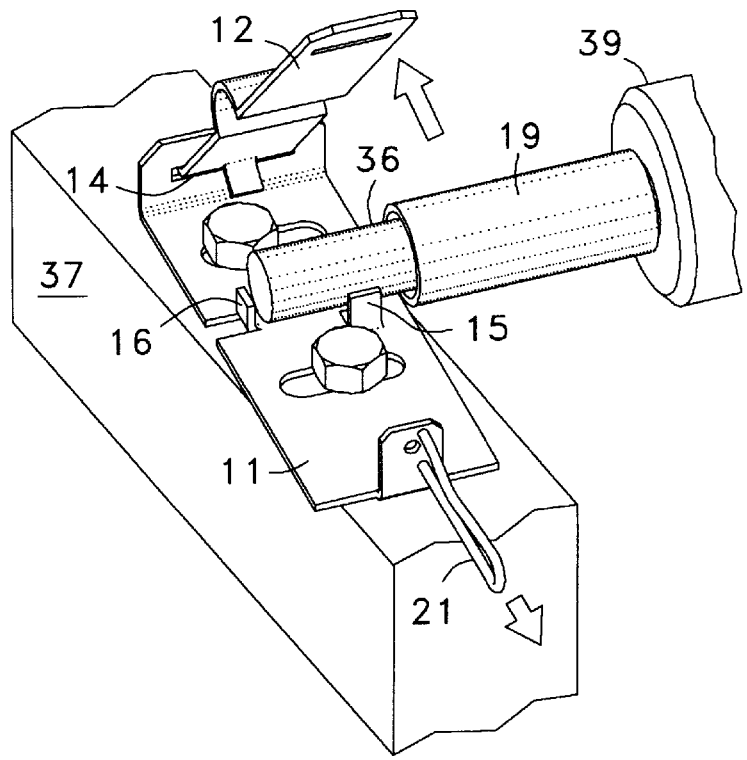

FIG. 15 Bottom frontal perspective view of axle end mounted with second embodiment FIG. 16 View as in FIG. 13, with pivoting plate released for axle removal.

REFERENCE NUMERALS

1. Shaft of releasable axle mount fastening bolt
3. Head of first releasable axle mount
4. Head of second releasable axle mount
5. Sheath of releasable axle mount
6. Compression spring
7. Hole for secondary retention pin
8. Hole for hasp of security lock
9. Polygonal base of shaft for rotational fixation of mount bolt
10. Retention area of sheath
11. Fixed plate
12. Pivoting plate
13. Cup arch
14. Hinge
15. Axle bracketing tab
16. Axle end tab (cup bottom)
17. Spring clip tab
18. Slot for spring clip tab
19. Axle centering sleeve
20. Conventional nut
21. Spring clip
22. Spring clip tab slot
23. Hinge tabs
24. Hinge slot
25. Bolt slot
26. Hole for pin or clip
30. Conventional wheel barrow wheel
31. Conventional axle end cup
32. Sleeve portion of conventional axle end cup
33. Axle end retainer tab on cup sleeve (cup bottom)

34. Fastening plate on conventional axle end cup
35. Slot in fastening plate for conventional bolt
36. Conventional wheel barrow axle
37. Conventional wheel barrow frame rail
38. Conventional bolt
39. Hub of conventional wheel barrow wheel
40. Conventional stabilizing strap between frame rails

DESCRIPTION

FIGS. 1 and 2 show a barrow wheel as seen when the barrow is inverted for wheel maintenance. On the right is a conventional axle cup (31) with fastening plates (34) bolted to the barrow frame (37). This type of conventional cup is separately shown in FIG. 5. On the left in FIG. 1, the fastening plates of the conventional cup are not bolted to the barrow frame. Instead, they are retained in a sheath (5) formed in the heads (3, 4) of mounting bolts made according to this invention. These mounting bolts are shown enlarged in FIG. 6, and are shown retaining a conventional cup in FIG. 7. A compression spring (6) around the axle acts between the wheel hub (39) and the cup (31) to hold the fastening plates in the sheath.

For wheel removal, the cup sleeve (32) on the left in FIG. 2 is pushed inward toward the hub (39), compressing the spring (6). This slides the cup fastening plates (34) out of the sheath (5), releasing the axle from the barrow frame (37). The axle (36) can now be tilted slightly away from the frame as shown in FIG. 4, allowing it to slide out of the cup sleeve (32) on the opposite (right) end of the axle. This releases the wheel for replacement or repair, as needed. The procedure is reversed for installation of a wheel.

Although two separate bolt heads (3 and 4) are shown, this is a manufacturing preference rather than a requirement. It allows for variations in the bolt hole spacing on the barrow rails for universal retrofitting. However, these two heads can be combined in a single head having two shafts if desired.

In case the spring (6) is lost, a pin hole (7) may be provided through the sleeve as in FIG. 8. A small nail can be dropped through this hole, passing through the bolt slot (35) of the cup fastening plate (34) to retain it in the sleeve despite the missing spring. For security, a lock hole (34) may be provided to accept the hasp of a conventional pad lock, to prevent theft of the wheel.

FIGS. 12–16 show a second embodiment of the invention, comprising a fixed plate (11) which is fastened by conventional bolts through slots (25) to the barrow rails. A pivoting plate (12) is attached to the fixed plate by a simple hinge (14) formed by bent alternating tabs (23) on the pivoting plate. Alternate tabs are inserted through a hole (24) in the fixed plate. This type of hinge is suggested for inexpensive manufacture, but any type of hinge can be used. The plate ends opposite the hinge are held together by a tab (17) inserted through a slot (22) and fixed by a removable pin or spring clip (21). When the two plates are pivoted together as in FIGS. 14–15, an effective cup is defined, bounded by an arch (13) on the pivoting plate (12), two axle-bracketing tabs (15) on the fixed plate, and an axle end tab (16) on the fixed plate. For wheel removal, the spring clip (21) is manually removed from its hole (26), allowing the pivoting plate (12) to rotate on the hinge (14), releasing the axle. The spring clip can be tethered to the fixed plate to prevent loss if desired.

The releasable axle mounts shown herein are only needed on one end of the axle, since the axle slips out of the second cup when the first end of the axle is released. Both mount embodiments shown herein can be used on one or both ends of the axle. The bent-plate design of the second embodiment is economical enough to use on both ends of the axle in original manufacture.

Although the present invention has been described herein with respect to preferred embodiments, it will be understood that the foregoing description is intended to be illustrative, not restrictive. Many modifications of the present invention will occur to those skilled in the art. All such modifications which fall within the scope of the appended claims are intended to be within the scope and spirit of the present invention.

I claim:

1. A tool-less releasable axle mount for wheel barrows, comprising:

an axle end cup having a fastening plate;

a sheath having an open end that slidably receives the fastening plate to a predetermined depth;

means for attaching the sheath to a frame rail on a wheel barrow; and, a compression spring urging the fastening plate into the sheath;

whereby the fastening plate can be pushed out of the sheath against the force of the spring.

2. A tool-less releasable axle mount for wheel barrows, comprising:

an axle end cup comprising first and second plates, each plate having a mid portion and first and second ends, the mid portions of the two plates defining the cup between them when the two plates are closed together;

means for attaching the first plate to a frame rail on a wheel barrow;

a hinge connecting the first ends of the two plates; and, a manually releasable fastener connecting the second ends of the two plates;

whereby the second plate can be manually pivoted away from the first plate, thus releasing the cup defined between them.

3. In a wheel barrow having a frame with a first and second rail, first and second axle end cups attached to the respective rails, each cup having an open end and a fastening plate, the open ends of the cups facing each other, an axle having first and second ends mounted in the respective cups, and a wheel mounted on the axle, the improvement residing in means for releasing without tools at least one of the cups from the respective rail, comprising:

a sheath attached to the first rail beside the wheel, having an entrance facing the wheel, the fastening plate of the first cup releasably inserted into the sheath; and, a compression spring mounted around the axle between the first cup and the wheel, urging the fastening plate of the first cup into the sheath;

whereby the fastening plate of the first axle end cup is held in the sheath by the spring, but it can be quickly released from the sheath by manually sliding the first axle end cup toward the wheel, thus disconnecting the wheel from the wheel barrow for maintenance.

4. In a wheel barrow having a frame with a first and second rail, first and second axle end cups attached to the respective rails, each cup having an open end and a fastening plate, the open ends of the cups facing each other, an axle having first and second ends mounted in the respective cups, and a wheel mounted on the axle, the improvement residing in means for releasing without tools the first cup from the first rail, comprising:

first and second plates, each plate having a mid portion and a first and second end, the first plate attached to the first rail, the mid portions of the two plates defining the first cup between them when the second ends of the two plates are held together;

a hinge connecting the first ends of the two plates; and a manually releasable fastener connecting the second ends of the two plates;

whereby the first cup can be manually released by pivoting the second plate away from the first plate.

5. A releasable axle mount kit for a wheel barrow, comprising:

a sheath adapted to receive a fastening plate on a wheel barrow axle end cup;

means for mounting the sheath on a rail of a wheel barrow frame; and a compression spring for mounting around an axle of a wheel barrow;

whereby a wheel barrow axle end cup can be detached from a wheel barrow frame rail and said sheath can be attached to the rail in its place, the spring can be slid upon the wheel barrow axle, then compressed by sliding the axle end cup upon the end of the axle, and the fastening plate of said axle end cup can be inserted into said sheath and held therein by said spring.

* * * * *